United States Patent
Hedrick

[15] 3,685,034
[45] Aug. 15, 1972

[54] ALTITUDE ALERTING APPARATUS
[72] Inventor: Geoffrey S. Hedrick, Katonah, N.Y.
[73] Assignee: Lear Siegler, Inc., Armonk, N.Y.
[22] Filed: Sept. 27, 1970
[21] Appl. No.: 67,550

[52] U.S. Cl. ............... 340/181, 340/27 NA, 340/198, 340/179
[51] Int. Cl. ...... G08b 21/00, G08c 19/48, G08g 5/00
[58] Field of Search .................. 340/181, 198, 27 NA

[56] References Cited

UNITED STATES PATENTS

| 2,901,739 | 8/1959 | Freitas | 340/181 |
| 3,048,836 | 8/1962 | Guarino | 340/198 |
| 3,482,231 | 12/1969 | Florek | 340/198 |
| 3,518,621 | 6/1970 | Collett | 340/198 |

Primary Examiner—Thomas B. Habecker
Attorney—Hubbell, Cohen & Stiefel

[57] ABSTRACT

An indication of altitude variation about a preselected altitude is provided from a real time altitude information input signal in response to an altitude alert control signal which is proportional to a pair of complementary sinusoidal functions, sine and cosine, of the altitude variation. The uncorrected altitude information and the preselected altitude information are both fed to fine and coarse transolvers which each provide the sine and cosine functions of the angular equivalent of the altitude variation. The relative magnitudes of these sinusoidal functions are compared to provide the alert control signal. The fine cosine signal is phase demodulated with the coarse cosine signal as a reference and the relative magnitude thereof compared with the relative magnitude of the fine sine signal in order to provide both an inner and an outer alert control signal for a logic network. The relative magnitudes of the coarse sine and cosine signals are also compared to provide an arming signal for the logic network. The logic network is responsive to the alert control signals to control both an aural and a visual alarm.

14 Claims, 4 Drawing Figures

FIG. I.

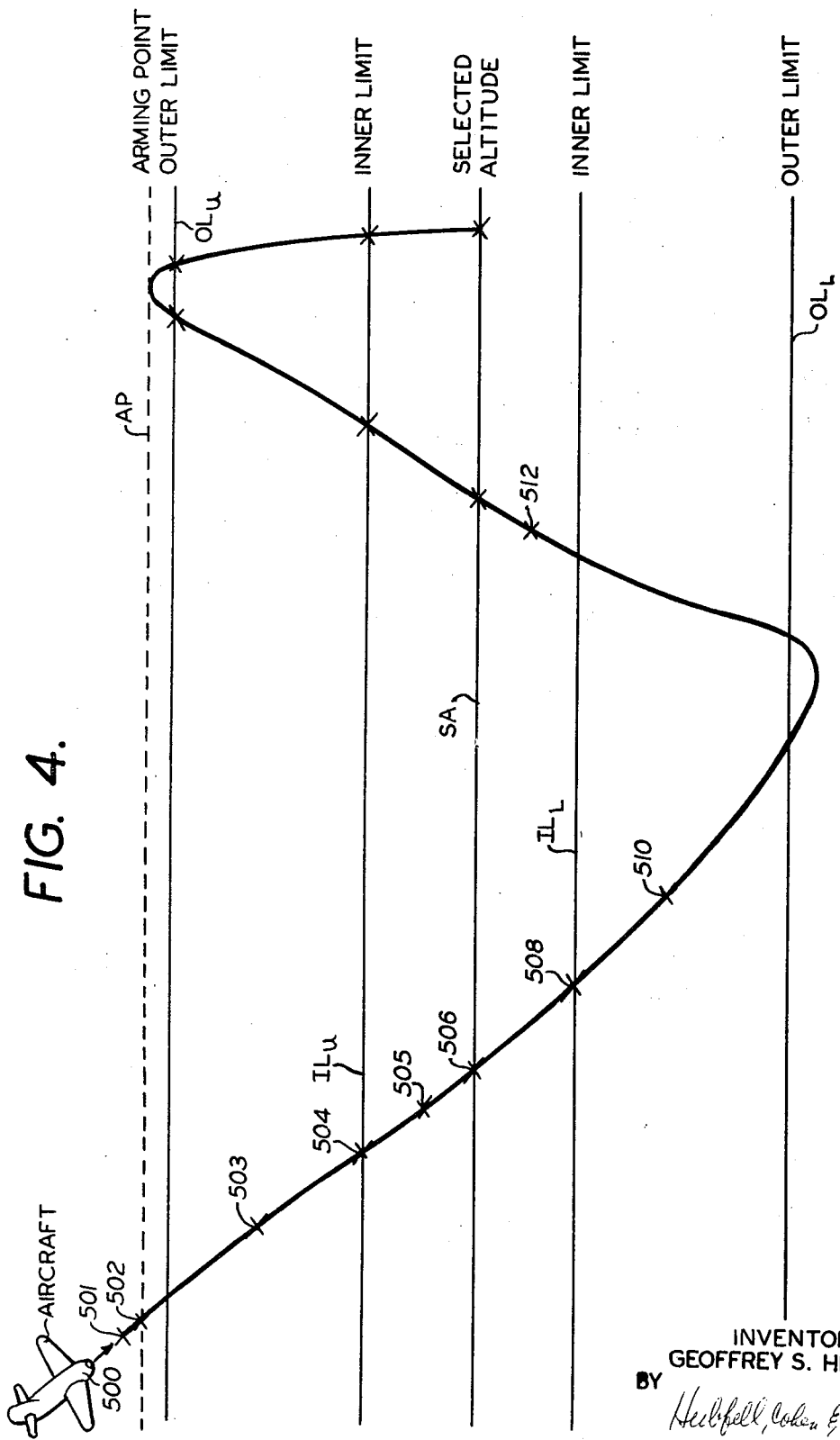

ALTITUDE ALERTING APPARATUS

BACKGROUND OF THE INVENTION

1. Field of the Invention

The present invention relates to altitude alerting apparatus in which an alert control signal which is proportional to a pair of complementary sinusoidal functions of altitude variation is provided from a synchro input signal representative of altitude, and more particularly for such apparatus in which a fine and a coarse synchro representation of the altitude variation is utilized in deriving the alert control signal.

2. Description of the Prior Art

Aircrafts are normally assigned preselected altitudes by air traffic controllers and these altitudes must be maintained within a certain range or altitude envelope, in order to prevent potential air collisions. It is therefore critical for the pilot of the aircraft to know when he has deviated from his assigned altitude and is outside the altitude envelope as well as, when he is approaching a new assigned altitude, to know when he is inside the altitude envelope. With today's complicated aircraft instrument panels, an altimeter display by itself is not sufficient to alert the pilot's attention to such deviations or approaches and additional means designed for this purpose commonly known as "altitude alerters", must be utilized.

Prior art altitude alerting devices which utilize a synchro-type input signal representative of the aircraft's present altitude are subject to errors such as those due to the transformation ratio of the synchro-transmitters of the altitude information and the excitation voltage. These errors may be considerable as the transformation ration of the synchro-transmitters may vary as much as plus or minus 5 percent, and the load inpedances on the synchro-transmitters may vary as much as plus or minus 10 percent initially and plus or minus 25 percent over the temperature range in a typical aircraft system. The inaccuracies resulting therefrom are not tolerable as a false alarm or a belated alarm may be produced which obviates the specific purpose of these altitude alerters of giving a warning at the time the aircraft has entered or left the altitude envelope and not some time before or after this event has occurred.

These synchro-type input altitude alerters normally utilize only one of a pair of complementary sinusoidal functions of the altitude variation to provide the alert control signals which results in phase errors which also affect the accuracy of the alerting system. Furthermore, if both the sine and cosine functions of the altitude variation from the synchro-transmitter are directly utilized in these prior art alerters, errors may still result from effects of phase shift in the synchro-transmitter, such as the phase shift variation due to temperature which may vary considerably as the aircraft altitude varies. Any errors in the accuracy of the alerting system are not tolerable as an error of, for example, 500 feet might mean the difference between a potential air collision and a near miss. The prior art altitude alerting devices as discussed above, are subject to inaccuracies which may subject the aircraft to these consequences. These disadvantages are overcome by the present invention.

SUMMARY OF THE INVENTION

An altitude alerting apparatus which provides an indication of altitude variation about a preselected altitude from an altitude information input signal in response to an altitude alert control signal is provided. The alerter includes means for providing the alert control signal proportional to a pair of complementary sinusoidal functions of the altitude variation from the altitude information signal and the preselected altitude information. The control signal providing means includes means, such as transolvers, for providing both a fine and a coarse pair of sine and cosine functions of the angular equivalent of the altitude variation. Means are also provided for comparing the relative magnitudes of these sinusoidal functions to provide the alert control signal.

The fine cosine signal is phase demodulated with the coarse cosine signal as a reference and the relative magnitude of the demodulated signal is compared with the relative magnitude of the fine sine signal in order to provide both an inner and an outer alert control signal for a condition responsive logic network. The relative magnitude of the coarse sine and cosine signals are also compared to provide an arming signal for the logic network. The logic network is responsive to the alert control signals to control both an aural and a visual alarm in accordance with the condition of the alert control signals. A single-shot is provided for triggering the aural alarm in response to a particular condition of the alert control signals in the logic network.

BRIEF DESCRIPTION OF THE DRAWINGS

FIG. 4 is a graphical illustration used in explaining the operation of the present invention.

DETAILED DESCRIPTION OF THE PREFERRED EMBODIMENT

Figure 1:
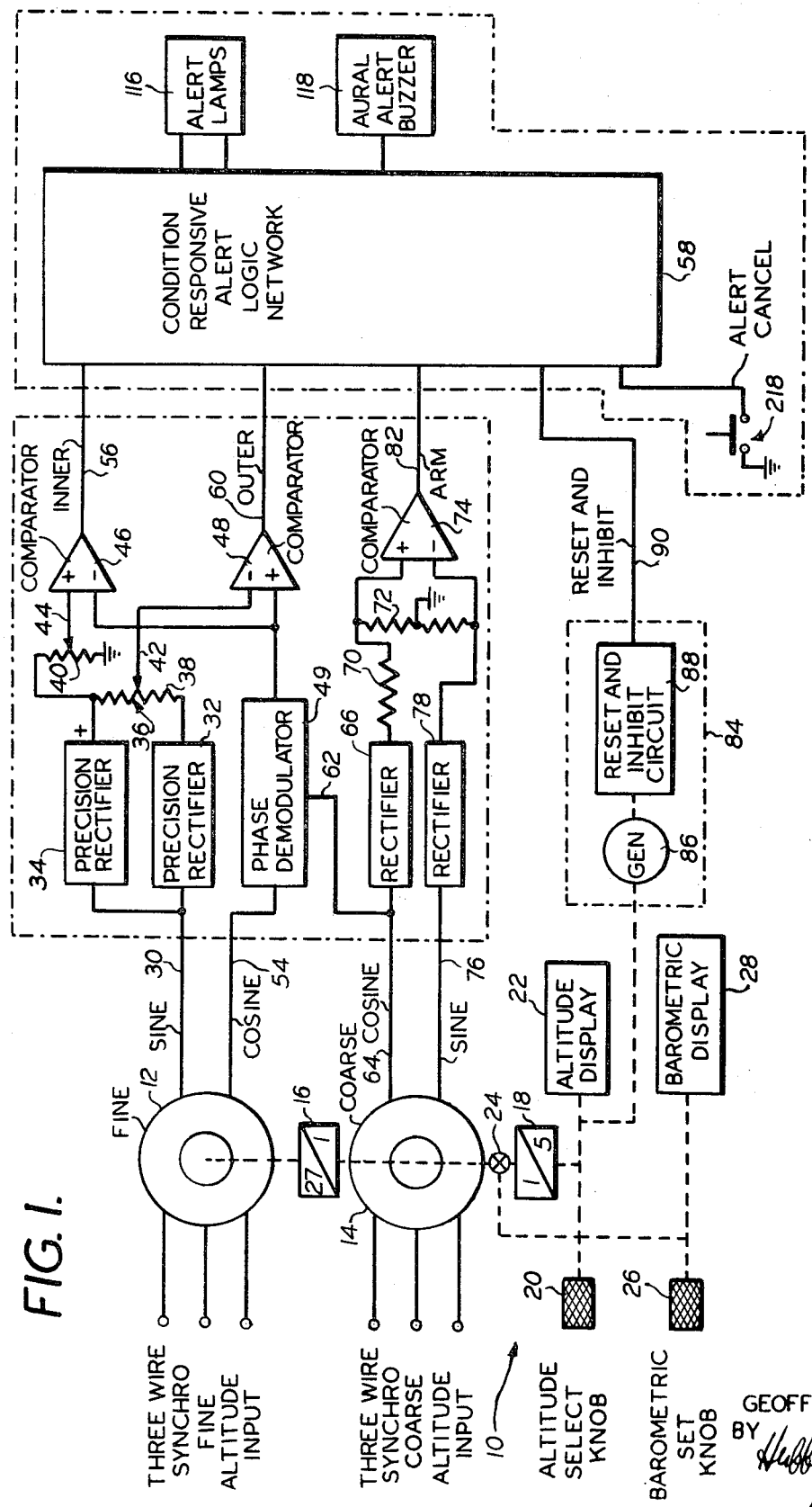
FIG. 1 is a block diagram, partially in schematic of an altitude alerter in accordance with the preferred embodiment of the present invention.

Referring now to the drawings in detail and especially to FIG. 1 thereof. The altitude alerter of the present invention, generally referred to by the reference numeral 10 preferably includes a pair of conventional high-impedance transolvers 12 and 14, each having a stator and a rotor (not shown). The stator is a Y-wound synchro control transformer stator and the rotor is conventionally wound with two identical perpendicular windings whose outputs preferably correspond in magnitude to the complementary sinusoidal functions sine and cosine, respectively, of the angular difference between the input angle and the shaft angle. One transolver 12 preferably receives a three wire synchro fine altitude input, such as 5,000 feet per revolution, and converts it into a two wire fine sine and cosine function of the angular equivalent of an altitude variation from a preselected altitude, while the other transolver 14 preferably receives a three wire synchro coarse altitude information input, such as 135,000 feet per revolution, and converts it into a two wire coarse sine and cosine function of the angular equivalent of the altitude variation from the preselected altitude in a manner to be described in greater detail hereinafter. Preferably the fine and coarse transolvers, 12 and 14 respectively, are identical and are geared through high precision gearing, such as a 27:1 ratio gearing 16 for the values previously mentioned, with respect to each other.

As was previously mentioned, the rotors of each of the transolvers 12 and 14 contains two identical perpendicular windings whose outputs are proportional to the sine and cosine respectively, of the shaft angle beta (B). Preferably, the transolvers 12 and 14 are set so as to produce a null from the sine windings thereof when the input altitude information is equal to the selected input altitude information displayed on an altitude display 20 which together with an altitude select knob 22 comprises an altitude select mechanism. The transolvers 12 and 14 are differentially geared to the altitude select knob 22, by which a desired or assigned altitude is selected, through a conventional gear reduction device 23, illustratively shown as having a gear reduction ration of 5:1, this ratio being dependent on the scale factor of the control knob 22 and transolvers 12 and 14. The position of the altitude select nob 22 determines the shaft angle beta of the transolvers 12 and 14 through the differential gearing connection 23 and in turn through differential gearing connection 16.

The transolvers 12 and 14 are further connected through a conventional gear connection 24 to a barometric set knob 26 which determines the barometrically corrected setting for the selected altitude in a conventional manner which will not be described in greater detail hereinafter. The barometric set knob 26 is connected to a conventional barometric display means 28 for displaying the barometric setting of the alerter device 10. The output of the fine transolver 12 is a pair of complementary sinusoids sine ($\theta$-B) and cosine ($\theta$-B), where theta ($\theta$) represents the altitude input angle of the transolver 12, and the output of the coarse transolver 14 is a pair of coarse complementary sinusoids sine ($\theta$-B) and cosine ($\theta$-B).

Figure 3:
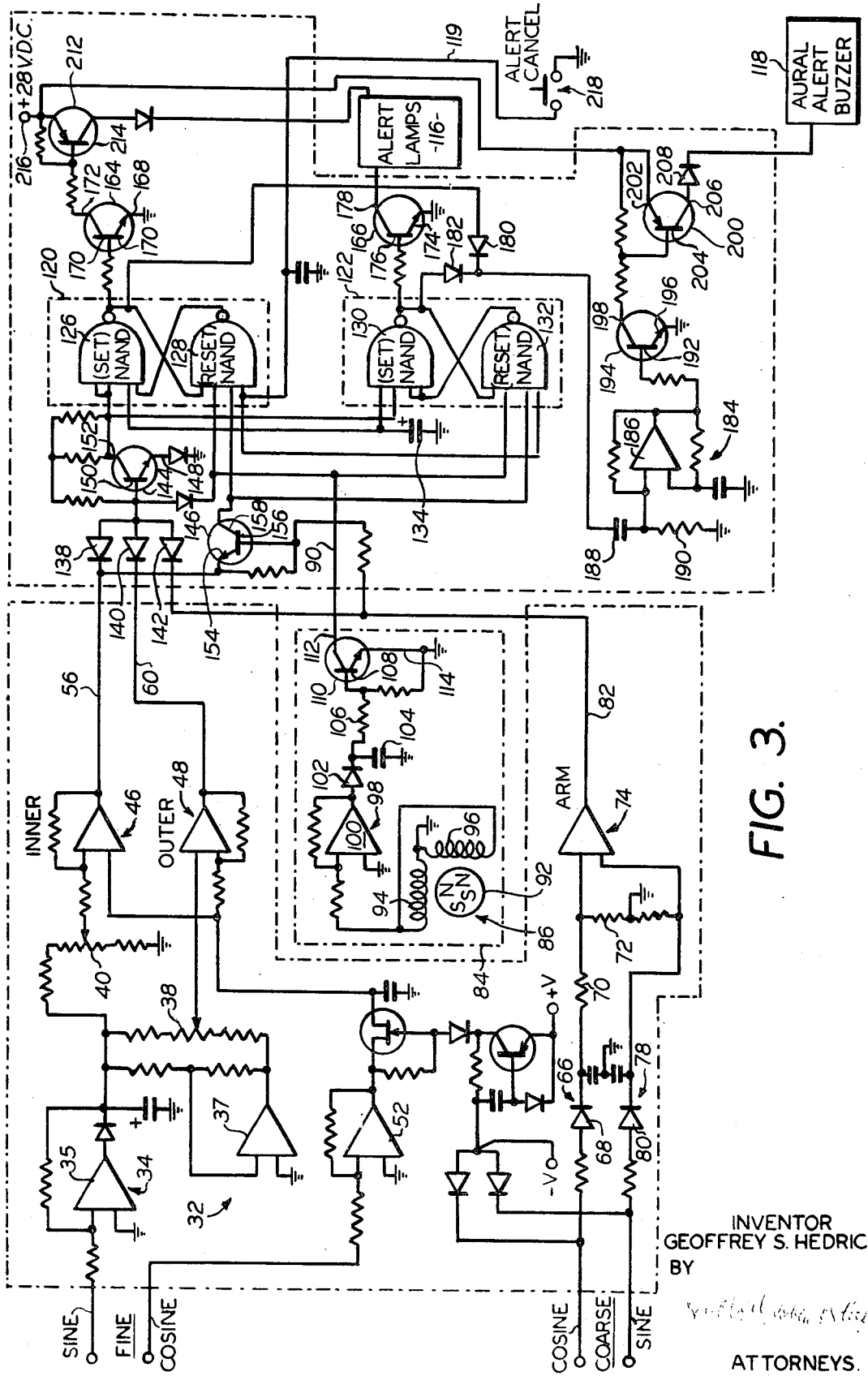
FIG. 3 is a schematic diagram, partially in block of the electronic circuitry associated with the embodiment shown in FIG. 1.

The output of the sine winding of the fine transolver 12 via path 30 is connected in parallel to a pair of high impedance precision rectifiers 32 and 34 which are preferably integrated circuit operational amplifier networks including a high gain operational amplifier 35 and a unity gain inverting amplifier 37, respectively, as shown and preferred in FIG. 3, which have their outputs operatively connected together through a series impedance network 36 including a potentiometer 38. In addition another potentiometer 40 is connected in parallel to the output of the precision recitifiers 32 and 34. Potentiometers 38 and 40 each have wiper arms 42 and 44, respectively, with wiper arm 44 being connected to a voltage comparator 46 to provide a positive input thereto and wiper arm 42 being connected to another voltage comparator 48 to provide a negative input thereto. The negative input to comparator 46 is connected to the output of a conventional phase demodulator 49 including a field effect transistor 50 (FIG. 3) whose input is connected to the output of an operational amplifier 52 (FIG. 3). The input of amplifier 52 of the phase demodulator 49 is connected to the fine cosine output of the transolver 12 via path 53. A modulation reference signal is provided to the phase demodulator 49 by a parallel connection via path 54 to the coarse cosine output, via path 55, of the coarse transolver 14.

The output of the phase demodulator 49 is also connected in parallel to the positive input of comparator 48. The output of comparator 46, which is the inner alert control signal, is connected via path 56 to the condition responsive alert logic network 58, and the output of comparator 48, which is the outer alert control signal, is also connected, via path 60, to the condition responsive alert logic network 58, to be described in greater detail hereinafter.

The coarse cosine output path 55 is also connected in parallel to a conventional rectifier 66, which preferably includes a diode 68, through a parallel impedance network 70–72 to the positive input of another voltage comparator 74. The coarse sine output of the coarse transolver 14, via path 76, is also connected through a conventional rectifier 78, which preferably includes a diode 80, to the negative input terminal of the voltage comparator 74. The output of this comparator 74, which is the logic arming signal, is connected via path 82 to the condition responsive logic network 58.

A logic transfer reset-and-inhibit network 84, which preferably includes a synchro generator 86 and a reset-and-inhibit circuit 88, is operatively connected to the altitude select knob mechanism 20 in order to provide a reset-and-inhibit signal via path 90 to the condition responsive logic network 58. Preferably, the synchro generator 86 of the logic transfer reset-and-inhibit network 84 includes a permanent magnet rotor 82 geared to the altitude select knob 20 and a pair of perpendicular stator windings 94 and 96. The stator windings 94 and 96 are in turn connected to a precision rectifier 98 which includes an operational amplifier 100 and diode 102. The output of diode 102 is in turn connected through a filter comprising a capacitor 104 and an impedance 106, to a base 108 of a high-gain transistor 110, illustratively shown as being an NPN transistor also having a collector 112 and an emitter 114. The collector 112 of the transistor 110 provides the reset-and-inhibit output signal to the condition responsive logic network 58 via path 90. The output of the condition responsive logic network 58 is preferably connected to an alert lamp network 116 for providing a visual alarm and to an aural alert buzzer 118 for providing an aural alarm.

CONDITION RESPONSIVE ALERT LOGIC NETWORK

Figure 2:
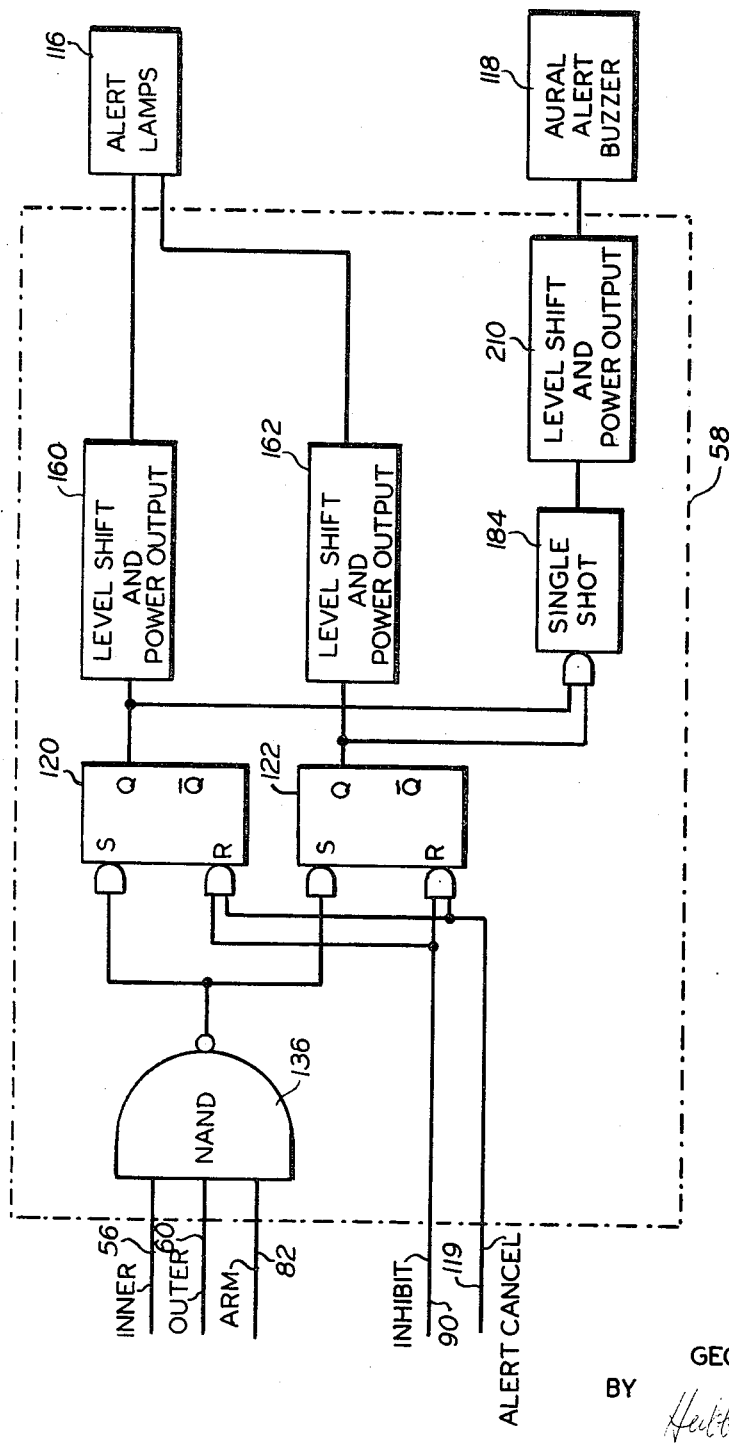
FIG. 2 is a functional block diagram of a portion of the embodiment shown in FIG. 1.

Now referring to FIGS. 2 and 3 and describing in detail the condition responsive alert logic network 58 which receives the inner alert control signal via path 56, the outer alert control signal via path 60, the arming control signal via path 82 and the reset-and-inhibit signal via path 90 to provide the altitude alert signaling condition therefrom, and also receives the alert cancel signal via path 119 to cancel an alert signal after it has occurred. As shown and preferred in FIGS. 2 and 3, the logic network 58 includes a pair of independent set-reset flip-flops 120 and 122 which each include a pair of cross-wired, four input, high level diode-transistorlogic (DTL) NAND gates, 126 and 128 for flip-flop 120, and 130 and 132 for flip-flop 122, both gates 126 and 130 being set gates and both gates 128 and 132 being reset gates. A capacitor 134 is preferably connected in parallel to an input of the set gates 126 and 130 in order to set the flip-flops 120 and 122 when power is applied so as to turn on the alert lamps 116 except if the aircraft is within the inner trip points. The logic network 58 also preferably includes a conventional three input diode-transistor-logic (DTL) NAND gate 136 which includes diodes 138, 140 and 142 and transistors 144 and 146. Diode 138 of the conventional DTL NAND gate 136 is connected via path 56 to receive the inner alert control signal, diode 140 is connected via path 60 to receive the outer alert control signal, and diode 142 is connected via path 82 to receive the arming control signal. Transistor 144 has an emitter 148, a base 150 and a collector 152, and transistor 146 has emitter 154, a base 156 and a collector 158 with collector 152 of transistor 144 being connected in parallel to set gates 126 and 130, and the collector 158 of transistor 156 being connected in parallel to reset gates 128 and 132.

The set output of each of the flip-flops 120 and 122 is connected through a conventional level shift and power output stage 160 and 162 (FIG. 2), each stage 160 and 162 preferably including a driving transistor 164 and 166, (FIG. 3) respectively. Driving transistor 164 has an emitter 168, a base 170 and a collector 172, and driving transistor 166 has an emitter 174, a base 176 and a collector 178. In addition, the set outputs of flip-flops 120 and 122 are coupled in parallel through diodes 180 and 182, respectively, to a single-shot network 184 which is preferably an integrated circuit monostable multivibrator including an operational amplifier 186, back-to-back coupled diodes 180 and 182, and a capacitor charging network including capacitor 188 and an impedance 190, where capacitor 188 and impedance 190 determine the time constant of the charging network.

Preferably, the single-shot network 184 is similar to the single-shot network shown and described in my copending patent application Ser. No. 67,543, filed Aug. 27, 1970 also entitled Altitude Alerting Apparatus in which the operational amplifier 186 has a pair of inputs having associated potentials $V_2$ and $V_1$, respectively with one input $V_1$ being connected in parallel to the R-C charging network 190–188, while the other input $V_2$ is connected in parallel through a source of positive charging potential. In such a network 184, the output of the single-shot operational amplifier 186 is fed to the base 192 of a driving transistor 194 also having an emitter and a collector 198, through a switching transistor 200, having an emitter 202, a base 204 and a collector 206, with the base 204 being connected in parallel to the collector 198 of the driving transistor 194 and, in turn, through a diode 208 to the aural alert buzzer 118 for intermittently triggering the operation thereof when a signal is present at the output of the operational amplifier 186.

Another level shift and power output stage 210, which includes driving transistor 194, is connected between the single-shot network 184 and the aural alert buzzer 118. The level shift and power output stages 160, 162 and 210 also include a switching transistor 212 which is connected in parallel to driving transistors 164 and 166 for the alert lamp network 116, and the switching transistor 200 which is connected to series switching transistor 212 via collector 202. The connections of the base 204 of switching transistor 200 to the collector 198 of driving transistor 194, and of the base 214 of switching transistor 212 to the collector 172 of driving transistor 164 provides isolation of the circuitry to any transients in a DC (Source) 216, which is preferably 28 volts.

As shown and preferred in FIGS. 1 and 3, a manual alert cancellation switch 218 is also provided which is coupled in parallel to the reset gates 128 and 132 via path 119 for resetting the flip-flops 120 and 122 manually after an alert signal has occurred in order to cancel the alert.

OPERATION

Now describing the operation of the alerter 10 when a three wire synchro fine altitude input and a three wire synchro coarse altitude input signal is received. The three wire fine altitude input is fed to the fine transolver 12 stator and the coarse altitude input is fed to the identical coarse transolver 14 stator. These transolvers 12 and 14, which are geared to the altitude select knob 22 also receive the preselected altitude information provided via altitude select knob 22 and the altitude input signal information provided via the three wire synchro inputs, into two perpendicular vector components which represent the sine and cosine of the angular position of the magnetic vector in the stator field. This difference represents the altitude variation from the preselected altitude. The output of the sine winding of the fine transolver 12 via path 30 is fed into the high impedance precision rectifier 34 operational amplifier 35 which preferably has a high open loop gain to insure high linearity at low input signals. Precision rectifier 34 provides a positive DC voltage whose magnitude is proportional to the RMS value of the AC signal input. This positive voltage is then inverted by the unity gain inverting amplifier 37 to provide an equal magnitude negative DC potential.

In order to sense the outer "trip point" and provide the outer alert control signal, the fine cosine winding output of transolver 12 which is provided via path 53 is demodulated by phase demodulator 49 in order to differentiate between the equal magnitude but opposite phase signals in the outer threshold adjustment range. The negative DC potential output of the unity gain inverting amplifier 37, which is the negative equivalent of the rectified fine sine winding output, is fed to voltage comparator 48 where it is compared with the demodulated fine cosine signal. The output of the voltage comparator 48 provides the outer alert control signal to the condition responsive alert logic network 58, potentiometer 38 being adjusted to preselect the desired "trip point" level. The reference signal for the fine cosine signal phase demodulator 49 which is provided by the coarse cosine signal output from transolver 14 via path 54 and 55, minimizes the effects of phase shift in the synchro-transmitter. In order to sense the inner "trip point" and provide the inner alert control signal to the logic network 58, the positive DC voltage from the rectifier 34 is scaled and then compared to the demodulated fine cosine signal by voltage comparator 46 to provide the inner alert control signal via path 56 to logic network 58, potentiometer 40 being adjusted to preselected a desired "trip point" level. The arming signal is provided to the logic network 58 by means of diodes 68 and 80 which are simple high impedance half-wave rectifiers which transform the coarse cosine and the coarse sine signals into positive DC signals whose magnitudes are directly proportional to the RMS values of the input signals. The coarse sine and cosine voltages are compared in voltage comparator 74 in order to provide the arming control signal to the logic network 58 to prevent synchro signal ambiguity.

Preferably, voltage comparators 46, 48 and 74 are saturated high gain operational amplifiers which provide a high output (logic 1) to the logic network 58 when the difference angle ($\theta$—B) is greater than the "-trip point" value for this angle, and a low output (logic 0) to the logic network 58 when this angle ($\theta$—B) is less than the "trip point" value. Furthermore, these voltage comparators 46, 48 and 74 preferably have a small amount of positive feedback in order to provide a small amount of hysteresis, such as 10 feet, in the "trip point". This hysteresis prevents intermittent visual and aural signals when the aircraft approaches the set altitude slowly or oscillates about one of the limits or thresholds. These comparators 46, 48 and 74 compare the relative magnitudes of the sine and cosine outputs of the respective transolver 12 and 14 in order to make the "trip points" independent of input signal amplitude and phase shift.

The altitude alerting apparatus of the present invention preferably has a deviate mode and an approach mode. The approach mode is provided when the aircraft is approaching a new assigned altitude from an old assigned or preselected altitude or during takeoff while approaching the assigned altitude, and the deviate mode is provided for once the aircraft has reached its assigned selected altitude. In the approach mode it is desirable to know when the outer limit or the altitude envelope has been reached, and when the inner limit of the altitude envelope has been reached. In the deviate mode it is desirable to know when the aircraft has strayed or deviated beyond the inner limit of the altitude envelope, and when the aircraft has strayed beyond the outer limit of the altitude envelope, as well as when it has returned within the inner limits of the envelope once again.

In accordance with these preferred indications, the inner, outer, and arming alert control signals which are provided to logic network 58 are fed to the NAND gate 136 which provides a negative pulse to set the flip-flops 120 and 122. This turns on the alerting lamps 116 when the aircraft deviates beyond the inner limits in the deviate mode, and when the aircraft is between the outer and inner limits in the approach mode. In the approach mode, when the inner limit is reached, the inverted inner alert control signal is gated by the arming signal via path 82 and transistor 146 into the reset gates 128 and 132 of the flip-flops 120 and 122, respectively, resetting the flip-flops 120 and 122, extinguishing the alert lamps 116 and placing the logic network 58 in the deviate mode. In the deviate mode, when the inner limit is exceeded, the NAND gate 136 sets the flip-flops 120 and 122, thereby turning on the alert lamps 116. The alert lamps 116 will remain on until the aircraft again approaches within the inner limit of the preselected altitude, the altitude is reselected which automatically resets the flip-flops 120 and 122, or the alert is manually cancelled by depressing switch 218.

Referring now to FIG. 4 in order to explain by way of example, how the condition responsive alert logic network 58 operates to provide alerting indications for a typical alerting sequence. For purposes of illustration, we shall assume that the point at which the arming signal is generated is just before the worst case outer limit point as the aircraft approaches from above or below the selected altitude. As previously mentioned, the function of the arming point signal is to prevent signal cycle ambiguity of the logic 58 when a synchro type sinusoidal alert control signal is utilized. The arming point is therefore preferably chosen as being equal to one-half the equivalent altitude recycle point of the synchro.

For purposes of illustration we shall describe the operation of the circuit for an aircraft 500 initially approaching a new selected altitude SA from above, the operation of the circuit if the selected altitude SA is initially approached from below being identical as the altitude envelope is symmetrical about the selected altitude SA. For purposes of explanation a "1" represents a signal being present or ON, and a "0" represents a signal being OFF. As the aircraft 500 approaches the selected altitude SA from beyond the altitude envelope, whose limits are determined by the outer limits $OL_U$ and $OL_L$, but is still above the arming point AP, such as represented by the position 501, the arming signal is OFF, the inner alert control signal if OFF and the outer alert control signal is OFF and no output is provided by NAND gate 136, Flip-flops 120 and 122 are, therefore, not set. When the arming point AP is reached at position 502, the arming signal is present. However, no inner or outer alert control signals are present and a low (0) output is provided from NAND gate 136. Flip-flops 120 and 122 are therefore, still not set, and no alert indication is provided.

As the aircraft 500 continues to position 503, which is between the outer limit $OL_U$ and the inner limit $IL_U$, the arming signal is still present, no inner alert control signal is present, but an outer alert control signal is present. This condition provides an output from NAND gate 136 to set flip-flops 120 and 122. This back biases the diodes 180 and 182 which thereby go high (logic "1") supplying the charging potential to capacitor 188 and causing capacitor 188 to charge through inpedance 190. While the capacitor 188 is charging, the potential $V_1$ associated with the input to which the capacitor 188 is connected is greater than the potential $V_2$ associated with the other input, and an output $V_3$ is provided from the operational amplifier 186. This output is in turn passed through driving transistor 194 and switching transistor 200 to the aural alert buzzer circuit 118 which is thereby triggered to emit a sound alarm along with the alert lamps 116 coming ON. The duration of the sound alarm is determined by the time constant R–C 190–188 of the charging network. When the capacitor 188 is fully charged, the associated potential $V_1$ of the input terminal connected thereto becomes less than $V_2$ and the operational amplifier 186 goes OFF thereby ceasing the operation of the aural alert buzzer 118.

When either of the diodes 180 or 182 go low (logic "0"), capacitor 188 does not charge and no aural alert is provided. When capacitor 188 is fully charged, and either 180 or 182 goes low, capacitor 188 discharges to ground. It should be noted that an aural alert is provided only when the lights are first turned ON, the set output of flip-flops 120 and 122 also providing a signal which turns ON the alert lamps 116.

As the aircraft 500 continues approaching the selected altitude SA and reaches the inner limit $IL_U$ at position 504, the arming signal is present, the inner alert control signal is present, and the outer alert control signal is present. This logic input condition, via transistor 46 and reset gates 128 and 132, resets flip-flops 120 and 122 extinguishing the alert lamps 116 and automatically reverting the alerting apparatus logic 58 to the deviate mode. This logic condition continues to exist when the aircraft 500 is between the inner limit $IL_U$ and the selected altitude SA at position 505, at the selected altitude SA at position 506, and once again at the lower inner limit $IL_L$ at position 508.

As the aircraft 500 continuous to proceed, with the alerting apparatus logic 58 now in the deviate mode, to a position 510 between the inner limit $IL_L$ and the outer limit $OL_L$, the inner limit signal is present but the outer limit signal is not. This sets flip-flops 120 and 122 which provides an output signal to the single-shot network 184 and the alert lamps 116. This output signal, once again, causes the emission of a sound alarm for the duration of the time constant of the charging network 188–190 and turns on the alert lamps 116. These lamps 116 will remain ON in the deviate mode until the alert has manually been cancelled by depressing switch 218 or the aircraft 500 returns once again within the inner limit $IL_L$ at position 512. The aircraft 500 alerting apparatus logic 58 remains in this deviate mode until a new selected altitude SA is selected by rotation of the altitude select knob 22, as will be explained in greater detail hereinafter. In this deviate mode, each time the aircraft 500 deviates beyond the inner limit $IL_U$ or $IL_L$, the intermittent sound alarm is heard and the alert lamps 116 go ON and remain ON until the aircraft 500 returns within the inner limits or the alert is manually cancelled.

The alert logic conditions which are present on paths 56 (inner limit), 60 (outer limit) and 82 (arm) can be summarized by the following table where a "1" represents the signal being present or ON and a "0" represents a signal being OFF.

TABLE

| Aircraft Location | Arm | Inner | Outer |
|---|---|---|---|
| Greater than arming point | 0 | 0 | 0 |
| Greater than arming point | 0 | 1 | 1 |
| Less than arming point and greater than outer limit | 1 | 0 | 0 |
| Less than the outer limit but greater than inner limit | 1 | 0 | 1 |
| less than or equal to the inner limit | 1 | 1 | 1 |

As shown in FIGS. 1 and 3 generator 86 and the reset-and-inhibit circuit 88 provide a reset-and-inhibit signal to the logic network 58 via path 90 which signal pulls down the input of NAND gate 136. All logic transfer is inhibited when this signal is present and the reset inputs 128 and 132 of flip-flops 120 and 122, respectively are subsequently pulled down thereby resetting the flip-flops 120 and 122 into the approach mode with the alert lamps 116 being extinguished. When the altitude select knob 22 is actuated during an altitude re-selection, the rotating permanent magnet 92 which is geared to the altitude select knob 22 generates an alternating current in the stator windings 94 and 96. This current is amplified and then rectified in precision rectifier 98. The rectified signal is then filtered via capacitor 104 and impedance 106 and fed into the base 108 of the high-gain transistor 110 which provides the reset-and-inhibit signal from the collector 112 via path 90.

If desired the altitude alerting condition responsive alert logic network 58 shown and described in FIG. 3 could be replaced by the condition responsive alert logic network shown and described in my copending patent application Ser. No. 67,543 filed Aug. 27, 1970 also entitled Altitude Alerting Apparatus, which is utilized therein for processing a digital altitude input signal. Furthermore, the altitude alerting apparatus of the present invention could utilize a single transolver if the accuracies provided by the fine-coarse transolver configuration are not required. Furthermore, if the altitude recycle point of the synchro is large enough so that signal ambiguity is not a problem, then the arming point signal and its associated logic can be omitted.

By utilizing the altitude alerting apparatus of the present invention, a synchro type of altitude input signal can simply and easily be utilized to provide indications or alerts of variations of an aircraft from a given preselected altitude. Such altitude variations will be provided substantially without the errors due to phase differences which normally occur when a synchro signal is utilized to control an altitude alerting logic network, and will be substantially independent of the transformation ratio of the synchro-transmitters of the altitude input information. Furthermore, by comparing the relative magnitudes of the two component vectors of the difference angle, or altitude difference between the input signal and the selected altitude, the altitude variation can be sensed within the accuracies of the synchros themselves.

As used throughout the specifications and claims the term "transolver" is defined to include any synchro-type component which provides two complementary sinusoidal outputs, such as sine and cosine.

It is to be understood that the above described embodiment of the present invention is merely illustrative thereof and numerous modifications and embodiments of the invention may be derived within the spirit and scope thereof.

What is claimed is:

1. An altitude alerting apparatus for providing an indication of altitude variation about a preselected altitude, within a preselected altitude envelope having an inner alert point altitude value and a different outer alert point altitude value with respect to said preselected altitude value, from an altitude information signal, said apparatus comprising:

generating means for providing a pair of complementary sine and cosine signals representative of a given altitude variation, each of said representative sine and cosine signals having a relative magnitude at said given altitude variations, means for applying said altitude information signal to said generating means, means for providing an altitude alert control signal from said altitude information signal, said control signal being proportional to said pair of complementary sinusoidal functions of said altitude variation, said altitude alert control signal providing means including means for comparing the relative magnitudes of said representative sine and cosine signals for providing said altitude alert control signal, and means for providing said indication in response to said alert control signal, said indication providing means being operatively connected to said control signal providing means.

2. An apparatus in accordance with claim 1 wherein said complementary sinusoidal functions are sine and cosine, respectively.

3. An apparatus in accordance with claim 1 wherein said apparatus has a deviate state and an approach state, said apparatus providing an indication of deviation away from said preselected altitude in said deviate state and approach toward said preselected altitude in said approach state, said apparatus including means for providing an aural-visual signal as said indication at said inner alert point value when said inner alert point value is approached from said preselected altitude in said deviate state and a visual signal as said indication at said outer alert point value when said outer alert point value is approached from said inner alert point value in said deviate state, and for providing an aural-visual signal as said indication at said outer alert point value when said outer alert point value is approached in the direction of said inner alert point in the approach state.

4. An apparatus in accordance with claim 1 wherein said indication providing means includes an indicator means and a condition responsive logic means responsive to said control signals to provide alert condition signals, said logic means including a single-shot means for intermittently driving said indicator means in response to said alert condition signals.

5. An apparatus in accordance with claim 1 wherein said altitude alert control signal providing means further includes means for phase demodulating said representative cosine signal, said comparing means comparing the relative magnitudes of said representative sine signal and said demodulated representative cosine signal.

6. An apparatus in accordance with claim 1 wherein said representative sine and cosine signal providing means includes a transolver having a stator and a rotor, said stator and rotor having an angular relationship representative of a given altitude and further having a reference angular relationship representative of the preselected altitude, said angular relationship between said rotor and stator varying with said variations in altitude, said sine and cosine signals being functions of the variation in said angular relationship.

7. An apparatus in accordance with claim 1 wherein said sine and cosine representative signal providing means includes means for providing a pair of fine representative sine and cosine signals as said altitude variation representative pair, and means for providing a coarse representative cosine signal, said altitude alert signal providing means further including means for phase demodulating said fine representative cosine signal with said coarse cosine signal as a modulation reference signal, said comparing means comparing the relative magnitudes of said representative fine sine signal and said demodulated representative fine cosine signal.

8. An apparatus in accordance with claim 7 wherein said means for providing a coarse representative cosine signal further includes means for providing a complementary coarse representative sine signal, said indication providing means includes condition responsive logic means for providing an output logic condition responsive to an input logic condition, said indication being provided responsive to said output logic condition, and said apparatus includes means for comparing the relative magnitudes of said coarse representative sine and cosine signals for providing an arming signal to said logic means.

9. An apparatus in accordance with claim 1 wherein said indication providing means includes condition responsive logic means, a first logic condition being provided to said logic means when said altitude alert control signal is at said inner alert point value and a second logic condition being provided to said logic means when said altitude alert control signal is at said outer alert point value, said indication being provided responsive to said conditions.

10. An apparatus in accordance with claim 9 wherein said apparatus has a deviate state and an approach state, said apparatus providing an indication of deviation away from said preselected altitude in said deviate state and of approach toward said preselected altitude in said approach state, said appratus further including means for changing said apparatus from said approach state to said deviate state when said inner alert point value is approached from said outer alert point value in said approach state and said condition responsive logic means includes bistable means having a set state and a reset state, a visual indication signal being provided by said indication means when said bistable means is in the set state and said indication signal being cancelled when said bistable means is in said reset state, said condition responsive logic means being operatively connected to said state changing means, a reset signal being provided to said bistable means when said first and third logic conditions are present in said approach state for resetting said bistable means and changing said indication means to said deviate state.

11. An apparatus in accordance with claim 9 wherein said apparatus has a deviate state and an approach state, said apparatus providing an indication of deviation away from said preselected altitude in said deviate state and of approach toward said preselected altitude in said approach state, said condition responsive logic means includes bistable means having a set state and a reset state, said indication providing means is responsive to a presence of a successive pair of said first logic conditions in said deviate state, said bistable means is set when the first of said successive pair of first logic conditions is present and reset when the second of said successive pair of first logic conditions is present, and a visual indication signal is provided by said indication means when said bistable means is in said set state, said indication signal being cancelled when said bistable means is in said reset state.

12. An apparatus in accordance with claim 9 wherein said apparatus has a deviate state and an approach state, said apparatus providing an indication of deviation away from said preselected altitude in said deviate state and of approach toward said preselected altitude in said approach state, said apparatus further including means for selecting a desired preselected altitude from a plurality of altitudes, said selecting means including means for inhibiting said logic means when said desired altitude selection occurs, said approach state being provided when said logic means is inhibited.

13. An apparatus in accordance with claim 9 wherein said apparatus includes means for providing an arming signal to said condition responsive logic means as a third logic condition.

14. An apparatus in accordance with claim 13 wherein said condition responsive logic means includes bistable means having a set state and a reset state, a set signal being provided to said bistable means when said second logic condition is present, a visual indication signal being provided by said indication means when said bistable means is in the set state.

* * * * *